H. H. HARDINGE.
COMPOSING MACHINE.
APPLICATION FILED DEC. 23, 1910.

1,131,643.

Patented Mar. 9, 1915.
10 SHEETS—SHEET 5.

Witnesses:
H. E. Brown
A. J. Cross

Inventor:
Henry H. Hardinge
By R. J. Jacker
Atty.

H. H. HARDINGE.
COMPOSING MACHINE.
APPLICATION FILED DEC. 23, 1910.

1,131,643.

Patented Mar. 9, 1915.
10 SHEETS—SHEET 6.

Witnesses:

Inventor.
Henry H. Hardinge
By R. J. Jaeller
Atty

H. H. HARDINGE.
COMPOSING MACHINE.
APPLICATION FILED DEC. 23, 1910.

1,131,643.

Patented Mar. 9, 1915.
10 SHEETS—SHEET 7.

H. H. HARDINGE.
COMPOSING MACHINE.
APPLICATION FILED DEC. 23, 1910.

1,131,643.

Patented Mar. 9, 1915.
10 SHEETS—SHEET 8.

Witnesses:

Inventor:
Henry H. Hardinge

UNITED STATES PATENT OFFICE.

HENRY H. HARDINGE, OF CHICAGO, ILLINOIS, ASSIGNOR, BY MESNE ASSIGNMENTS, TO JOSIAH CRATTY.

COMPOSING-MACHINE.

1,131,642.　　　　Specification of Letters Patent.　　Patented Mar. 9, 1915.

Application filed December 23, 1910. Serial No. 598,961.

*To all whom it may concern:*

Be it known that I, HENRY H. HARDINGE, a citizen of the United States, residing at Chicago, in the county of Cook and State of Illinois, have invented a new and useful Composing-Machine, of which the following is a specification.

My invention relates to a composing machine of the solid line or slug casting class in which keys are operated to assemble matrices into a line from which the line or slug is cast. The lines or slugs being used in the art of printing.

The objects of my invention are first, to cast the lines in a vertical position; second, to have the matrices hung on pivots and to fall into an assembled position by gravity; third, to provide means for automatically restoring the matrices to their stored position after the line has been cast; fourth, to afford a new and novel means for justifying the assembled line of matrices; fifth, to prevent the operation of the machine if the line of matrices is improperly assembled; sixth, to facilitate the rapid and accurate operation of casting type lines; seventh, to provide a cheap, simple and durable construction, and other objects to become apparent from the description to follow.

This machine is provided with a clamping device for holding the assembled matrix bars or plates in a vertical row. Each matrix bar or plate is secured on one end of a rod whose other end is pivoted to a vertical standard extending up from the horizontal top plate of the machine. In their normal position the matrix bar rods are held in an oblique position by escapement devices arranged to be operated by keys upon a keyboard, so that any desired matrix bar can be released and dropped by gravity into an assembled position between the jaws of the clamping device which are at such time ajar. The justifiers are mounted and operated in the same manner as the matrix bars. After the matrix bars and justifiers are assembled into a line power is applied so that the cam shaft is caused to make one revolution, and by mechanism provided the assembled line of matrices is clamped against a mold, a casting pot is brought adjacent to the mold, the molten metal is forced into the mold against the intaglio characters on the matrix bars, the mold with the line cast therein is moved away from the casting position, the line of type is trimmed, ejected from the mold onto a receiving galley and the matrix bars and justifiers are returned to their stored position. All these operations as well as the automatic shutting off of the power applied to the cam shaft are accomplished by the single revolution of the cam shaft.

I have illustrated a machine embodying my invention on the accompanying ten sheets of drawings forming a part of this specification, in which—

Fig. 10ª, is a similar view, fragmentary, showing a modified form of justifier.

Similar reference characters refer to similar parts throughout the several views.

The frame of the machine comprises a base portion consisting of the two side members 26 and 27 and the necessary braces connecting them, and upright inverted U shaped supporting frame 28 surmounted by a bracket 29, and two segmental horizontal top frames or tables 30 and 31. Secured to brackets extending forward from the under side of the tables 30 and 31 is the keyboard 32.

Concentrically arranged to the two tables 30 and 31 is the assembled line clamping device comprising the stationary block 33 secured to a bar 34 which is secured to the under side of the tables 30 and 31. The block 33 is provided with a shelf 35 on one of its edges upon which the assembled line of matrix bars is arranged to rest. Each matrix bar comprises a rectangular plate 36 provided with an intaglio character 37, and a rod or wire 38 secured to one end of said plate 36. The rod 38 is preferably made with two branches 39 (see Figs. 11, 13, 15 and 16) which are provided with the outwardly bent ends 40 which are sprung into holes provided therefor in the vertical channels 41 secured near the peripheral edge of the tables 30 and 31. Each channel 41 is preferably U shaped in cross-section and its parallel sides are provided with concentric holes. An equal number of channels 41 are preferably secured to each table 30 and 31 arranged in arcs concentric with the clamping device and the position construction and arrangement of the matrix bars are such that any and all of the matrix plates 36 will drop into position on the shelf 35 when released from their stored position so as to form a vertical pile on said shelf and the intaglio characters 37 on the plates 36 will be in a vertical line.

To retain the matrix bars in a stored position and release them from such position one at a time an escapement arrangement is provided for each row of matrices which is best seen in Figs. 13, 14 and 15 and 16. This escapement comprises a rod 42 mounted to partly rotate in a bracket 43 secured to and extending above each table 30 and 31. The rod 42 is preferably set on an incline and has its protruding end provided with oppositely disposed spring pressed catches 44 and the diametrically oppositely disposed stationary stops 45 at right angles to the catches 44.

When the matrix bars are in their stored position the rod 38 and the catches 44 are in a position to prevent the branches 39 sliding off of the rod 42. As previously stated the matrix bars are stored in an inclined position so that they will fall by gravity about their pivots as soon as they are released until the plate 36 is brought to rest by the shelf 35, so that if the rod 42 is turned a one quarter revolution the catches 44 will be moved out of the path of the branches 39 and thus allow the lowermost matrix bar to drop.

The stops 45 on rod 42 are secured such distance from the catches 44 that they will be moved under and in the path of branches 39 of the second matrix bar in the row and prevent it and all succeeding ones from falling into an assembled position. It is clear that the one-quarter rotation of rod 42 will allow only one matrix bar to fall into the assembled position and when the rod 42 is returned to its normal position the next succeeding matrix bar will drop a short distance so that it will be supported by the catch 44 and will drop to the assembled position at the next operation of rod 42. Of course, it will be understood that matrix bars bearing like characters are stored on the same rod 42 so that there are as many rods 42 as there are characters used in the machine. Each rod 42 is operatively connected to a key upon the keyboard 32 in such manner that when a key is depressed its coöperating rod 42 will be given a one-quarter revolution and one matrix bar will be permitted to fall into the assembled position.

Figure 17:
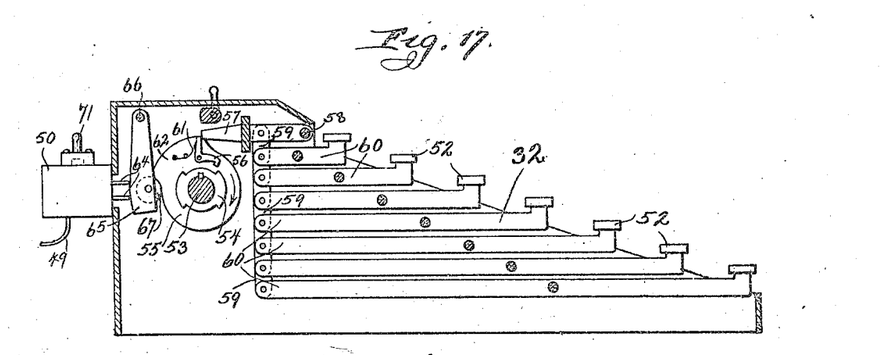
Fig. 17, is a vertical section through the keyboard.
Figure 18:
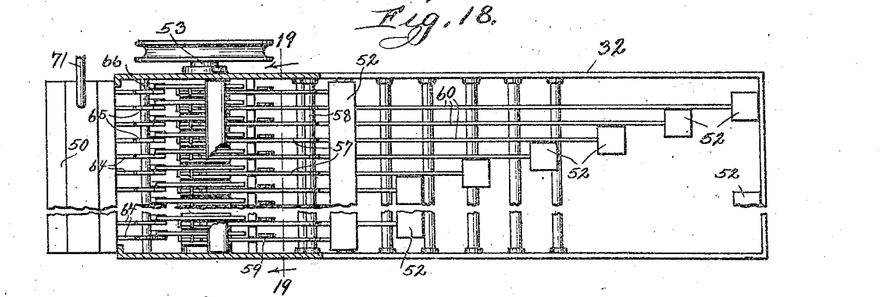
Fig. 18 is a fragmentary plan view of the same partly in section.
Figure 19:
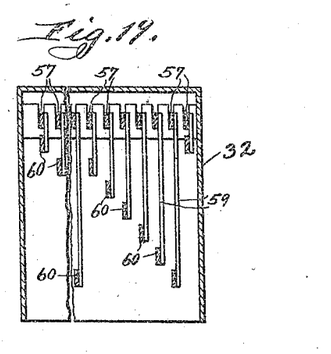
Fig. 19, is a section on 19—19 of Fig. 18.

Any convenient connection may be provided between the keys of the keyboard 32 and the rods 42, mechanical or otherwise; I have shown such connection made by providing a crank 46 on rod 42 which is connected by a rod 47 to a piston arranged to move in a cylinder 48. A tube 49 is connected to the cylinder 48 which leads to a valve chest 50 adjacent to the keyboard 32. The valve chest 50 is provided with as many valves 51 as there are keys 52 on the keyboard, and each valve is operatively connected to its coöperating key by mechanism which will cause a valve to be moved each time its coöperating key is depressed. This I preferably accomplish by providing a constantly driven shaft 53 with notched disks 54 and rotatably mounting on said shaft 53 adjacent to each disk 54 a cam wheel 55 provided with a spring pressed pivoted pawl 56 arranged to engage the notches in disk 54. The pawl 56 is normally held out of engagement with the disk 54 by its lateral extending arm resting against the finger 57 which is pivoted on rod 58 and is connected by link 59 to the key lever 60, in such manner that when the key 52 is depressed the finger 57 will be lifted and swung about its pivot 58 out of the path of the extension on pawl 56. As soon as the finger 57 is removed from back of the extension on pawl 56 the pawl is swung on its pivot by spring 61 so as to engage the notch in disk 54 and cam wheel 55 is caused to rotate with shaft 53 in the direction indicated by the arrow in Fig. 17. The cam wheel 55 will have made one complete revolution when the pawl 56 is drawn out of engagement with the notched disk 54 by its extension striking against the finger 57, said finger having returned to its normal position again. Each key 52, (of which there are 35 shown) has its coöperating finger 57 and cam wheel 55.

The cam wheel 55 is provided with the cam surface 62 which as the wheel revolves serves to move valve 51 back and compress the coiled expanding spring 63. The valve 51 preferably has the extending stem 64, and a depending arm 65 loosely hung on rod 66 is interposed between the end of stem 64 and cam wheel 55 and is preferably provided with an antifriction roller 67 to engage the cam wheel 55. The position of the cam surface 62 and roller 67 is such that the roller 67 will rest against the abrupt inclined end of the cam surface 62 when the cam wheel 55 has made a complete revolution, and the tension of spring 63 is strong enough to prevent spring 61 from forcing cam wheel 55 in a reverse direction.

The valve 51 is arranged to slide in a chamber 68 provided in chest 50 and a passage 69 connects said chamber with an air duct 70 which is constantly filled with compressed air.

Figure 20:
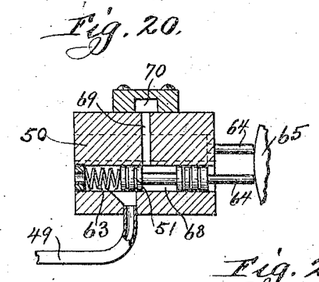
Fig. 20, is a cross section through a pneumatic valve chest used in connection with the keyboard.
Figure 21:
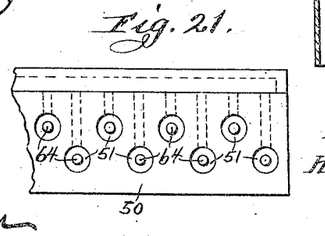
Fig. 21, is a fragmentary front elevation of the same.

When the valve is in its normal position as seen in Fig. 20, the air from duct 70 is prevented from passing into tube 49, but when said valve is moved to its operated position by the rotation of cam wheel 55 the air from duct 70 will pass through passage 69 chamber 68, tube 49 into cylinder 48 and move the piston within the same so as to give rod 42 a one quarter rotation, thus permitting a matrix bar to fall into the assembled position.

Compressed air is supplied from any convenient source through pipe 71 to duct 70.

The justifiers are wedge shaped bars 72, each secured to the ends of a pair of parallel rods 73 spaced apart to form a vertical slot between them, and terminating in outwardly bent ends which are sprung into holes provided therefor in vertical U shaped channels 74 secured to a sliding bar 75 which is preferably fitted to slide in a dove-tail groove in the upper surface of the tables 30 and 31. There are two bars 75 one on table 30 and the other on table 31, these being arranged in line with each other and a horizontal line drawn longitudinally through the center of bars 75 will intersect at right angles a vertical line drawn through the center of the assembled matrix bar plates 36. The justifiers 72 are slightly narrower than the matrix bar plates 36 for the purpose of alining the plates 36 vertically and still permit the longitudinal movement of the justifiers 72. The justifiers are stored in an inclined position by an escapement device which is identical with that already described in connection with the matrix bars. The justifiers are so mounted that they will fall by gravity into the assembled line above the shelf 35, and to retain the plates 36 in horizontal alinement two oppositely inclined wedges or justifiers are dropped into the assembled line at a time, that is one from either side, upon the operation of the proper key. To prevent the justifiers from interfering with each other while falling into the assembled line I prefer to store those on one side of the machine in a more elevated position than those on the other side, which insures the latter always reaching the assembled position first.

A vertical pusher 76 is mounted on each bar 75 which is straddled by the rods 73 when the justifiers fall into position in the assembled line, the pusher 76 being only a short distance back from the thick end of the wedge 72, and it is clear that if the bars 75 are advanced toward each other the pushers 76 will first contact with the thick ends of their respective coöperating wedges 72 and then push said wedges in opposite directions through the assembled line far enough to completely justify the line; when the line is completely justified the wedges cease advancing through the line because the pressure applied to the bars 75 is through the interposition of a spring to be described. It will be noted that the pushers 76 must advance a short distance before they will contact and begin to move the justifiers 72; to permit of such movement the rods 73 are made of spring wire and curved or bent a short distance from their pivoted ends. When the bars 75 are moved the spring wire rods 73 will bend enough to permit the pushers to engage the thick ends of the justifiers 76.

Figure 10:
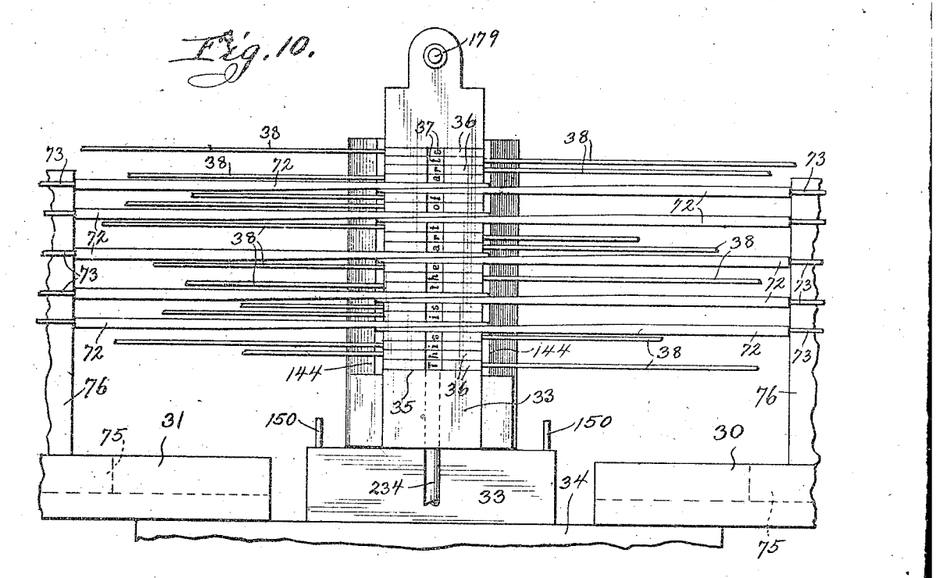
Fig. 10, is a face view of an assembled line of matrices in the casting position with the mold removed.
Figures 10A, 11, 12:
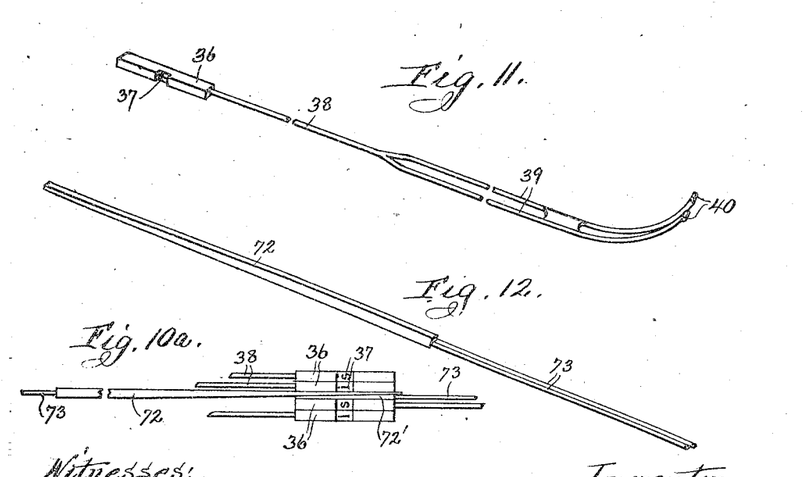
Fig. 11, is a perspective view of a matrix bar.
Fig. 12, is a perspective view of a justifier.
Figures 13, 15, 16:
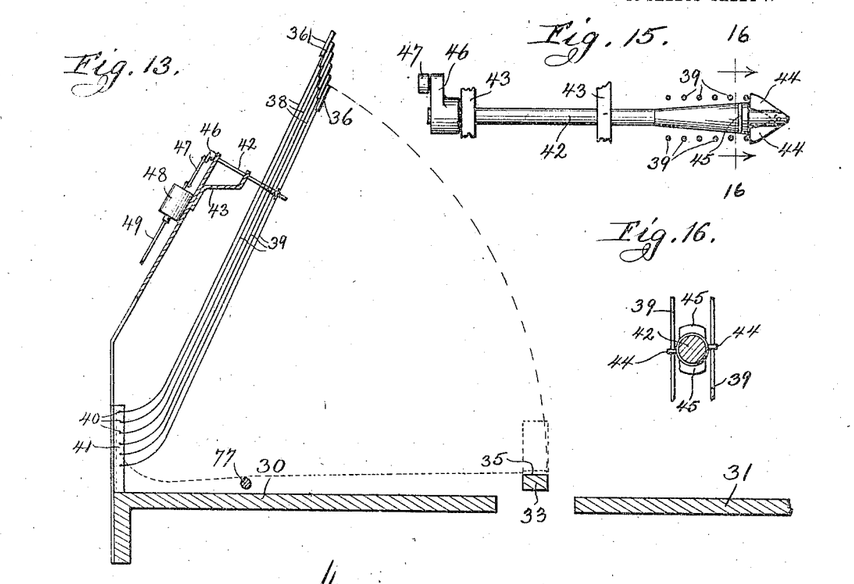
Fig. 13, is a vertical sectional view through a series of like matrix bars showing their fastening to the frame top and the releasing escapement for the same.
Fig. 15, is an enlarged detail view of the escapement used in connection with the matrix bars and justifiers.
Fig. 16 is a section on 16—16 of Fig. 15.
Figure 14:
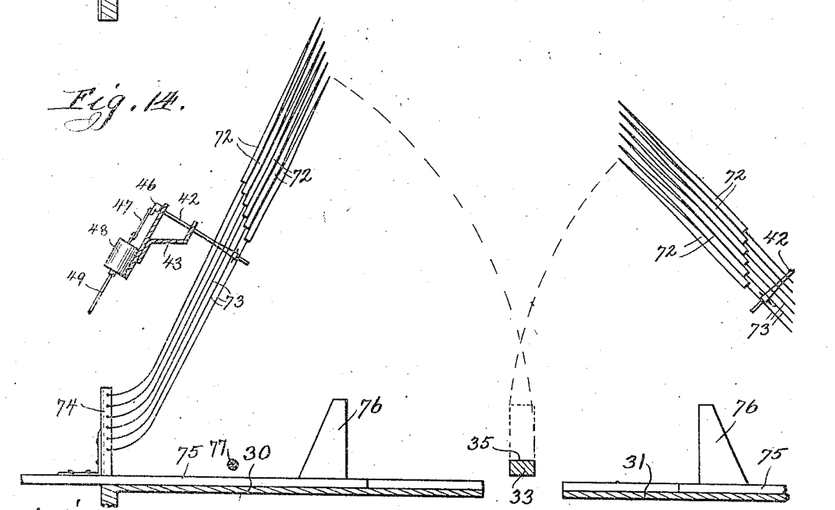
Fig. 14, is a similar view of a series of justifiers.

If preferred the wedges which enter one side of the assembled line may be made to remain stationary while those on the other side of the line are pushed through the line by the pusher 76. When only one set of movable wedges are employed of course only one sliding bar 75 is employed, the upright channel 74 to which the justifiers are pivoted being secured to the table, and the wedges 72' which are not pushed through the line are preferably made of the same length and breadth as the plates 36 of the matrix bars, as shown in Fig. 10ª.

The rods 38 of the matrix bars and the rods 73 of the justifiers are preferably bent in a curve near their pivoted ends so they can bend slightly to compensate for the movement of the plates 36 and wedges 72 when the assembled line is being clamped into proper alinement.

To lift all the matrix bars and justifiers which have been dropped into the assembled position, back to their stored position on the escapement rods 42 two curved lifting rails 77 are provided above the tables 30 and 31 secured to the upper ends of the vertically sliding rods 78 mounted in the frames 26 and 27 and arranged to be actuated by their connection through links 79 with the crank arms 80 secured to the rock shafts 81 which are connected through the gears 82 and 83 to the rock shaft 84. The rock shaft 84 is given a one quarter revolution at the proper time by having a crank 85 secured thereto, to the free end of which is pivotally secured a bar 86 provided with an anti-friction roller to contact with a cam wheel 87 secured on the cam shaft 88 mounted in bearings on the frames 26 and 27.

A cycle of operations of the machine is performed by one complete revolution of the shaft 88 which is accomplished by a clutch and a throwing-out device arranged on and connecting shafts 88 and 89, the latter being a hollow constantly running shaft mounted in bearings in the frames 26, 27 and 27′ and provided with the driving pulley 90.

Figure 22:
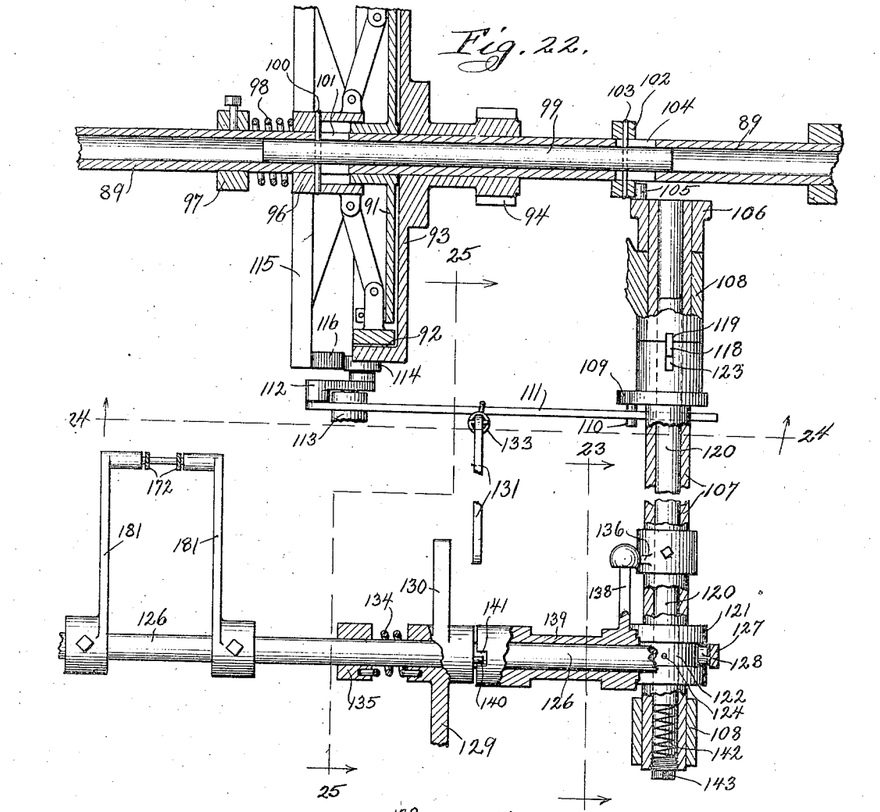
Fig. 22, is a detail plan section showing the connections between the starting lever and the driving shaft.
Figure 23:
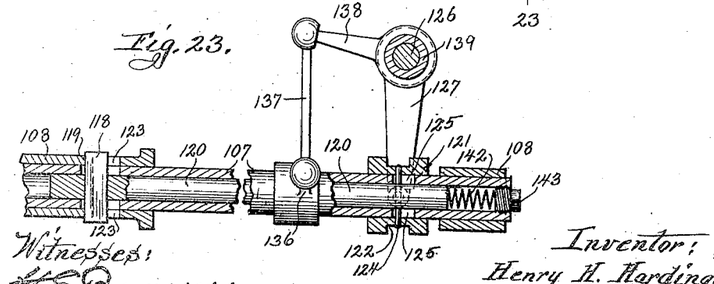
Fig. 23, is a section on 23—23 of Fig. 22.
Figure 24:
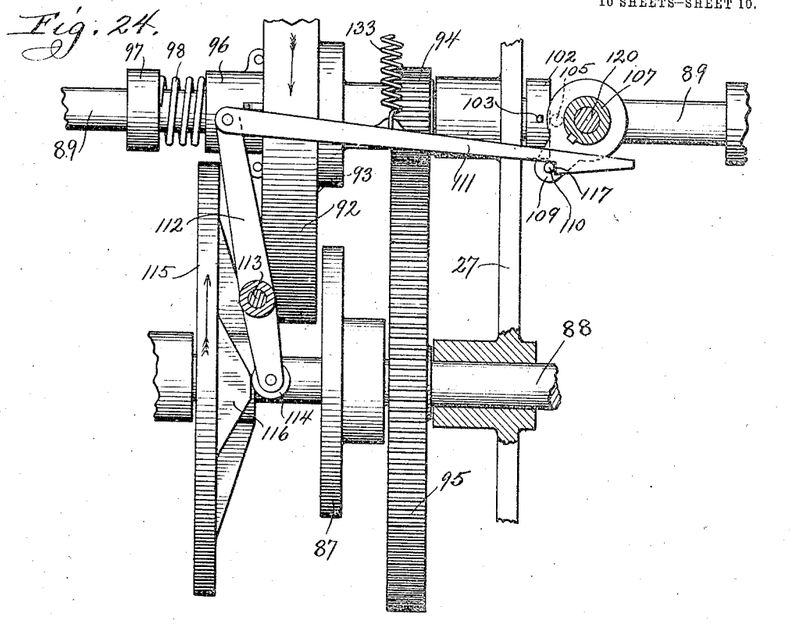
Fig. 24, is a section on 24—24 of Fig. 22.
Figure 25:
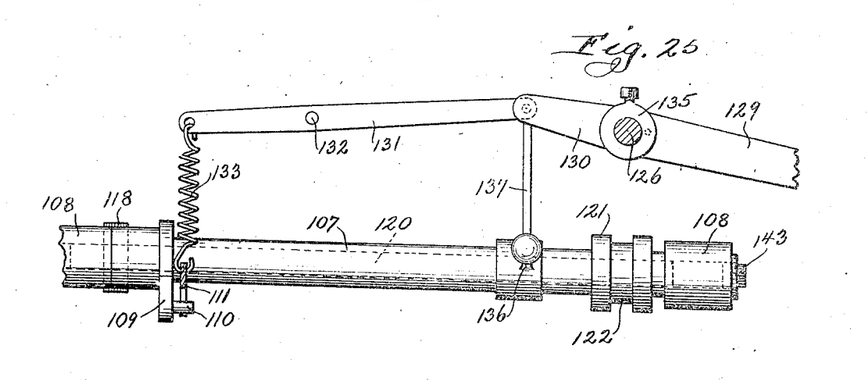
Fig. 25, is a section on 25—25 of Fig. 22.

Rigidly secured on shaft 89 is one member 91 of a friction clutch 92, the other member 93 is loosely mounted on said shaft 89 and has integral therewith the small gear 94 which is constantly in mesh with the large gear 95 rigidly mounted on the cam shaft 88 as seen in Figs. 22 and 24. The clutch 92 is provided with the customary sliding member 96 which when moved in toward member 91 will cause the members 91 and 93 to be clutched together and of course rotate together. A collar 97 is secured on shaft 89 a short distance from member 96 and a coiled expanding spring 98 is interposed between the collar 97 and member 96 which constantly tends to move member 96 in a direction to clutch the two members of clutch 92 together, but member 96 is normally prevented from being thus moved by mechanism to be described.

It will be seen from the description thus far given that, when clutch 92 is open the constantly running shaft 89 will alone be in action and when clutch 92 is closed the cam shaft 88 will be driven by shaft 89 until the clutch 92 is again moved to its open position. Furthermore it is clear that if cam shaft 88 be provided at one point with means for moving clutch 92 to an open position, said shaft when driven will make one complete revolution and then automatically stop itself; and such result is accomplished by rigidly connecting member 96 to a shaft or bar 99, arranged to slide longitudinally within shaft 89, preferably by a pin 100 passing diametrically through both and free to move in slots 101 provided in shaft 89, so that member 96 and bar 99 can move longitudinally independent of shaft 89. The bar 99 is similarly secured to a collar 102 mounted to slide on shaft 89 by a pin 103 which is free to move in slots 104 in said shaft 89, thus the member 96 and collar 102 are rigidly fixed together and always move together.

The collar 102 is normally held in a position to compress spring 98 and hold clutch 92 open by an eccentric pin or roller 105 secured to a collar 106 mounted on the end of a hollow shaft 107 in the same horizontal plane with shaft 89 and mounted to rock in bearings 108 secured to frame 27. The normal position of roller 105 is preferably on dead center, that is, such that the pressure exerted by spring 98 on roller 105 will be in a direct line with the center of shaft 107.

Secured to rock shaft 107 is a crank arm 109 having on its free end a lateral extending pin 110 on which rests the free end of an arm 111 pivoted to the upper end of a lever 112 pivoted at 113 on a bracket secured to frame 27. The lower end of lever 112 is provided with an anti-friction roller 114 arranged to engage the cam wheel 115 which is provided with the lateral extending cam 116 and is rigidly secured to the shaft 88.

In operation the clutch 92 is closed by spring 98 when shaft 107 is partly revolved by mechanism to be described, and the cam shaft 88 revolves until cam 116 swings lever 112 about its pivot far enough for hook 117 on arm 111 to engage pin 110 and rock the shaft 107 to again open clutch 92 by roller 105 moving collar 102.

Although the roller 105 is on dead center when clutch 92 is open, to prevent it from being accidentally moved the shaft 107 is locked against rotation by a flat pin or bolt 118 passing diametrically through shaft 107 having its extending ends resting in slots 119 provided in the bearing 108. The bolt 118 is secured in a shaft or bar 120 arranged to move longitudinally in shaft 107; bar 120 is also rigidly secured to the sleeve 121 mounted to slide on shaft 107 and provided with an annular groove 122. The bolt 118 is permitted to move longitudinally of shaft 107 by the provision of slots 123 in said shaft and pin 124 which serves to connect bar 120 to sleeve 121 can move in slots 125 provided in shaft 107.

Secured to a rock shaft 126 mounted in bearings secured to frames 26 and 27, and located above and at right angles to shaft 107, is an arm 127 having on its free end a roller 128 resting in groove 122 of sleeve 120. These parts are so arranged that when shaft 126 is rocked by lifting starting lever 129 the arm 127 will be moved and transmit motion to bar 120, through its connection therewith by roller 128 and sleeve 120, in a direction to slide bolt 118 out of the slots 119 in the bearing 108 leaving shaft 107 free to be rocked providing the hook 117 is lifted out of engagement with pin 110 which is preferably a rearward extension 130 on lever 129 which is jointed to one end of a lever 131 pivoted at 132 to frame 27; the other end of lever 131 is connected by a coiled contracting spring 133 to the arm 111. The spring 133 is provided to compensate for the movement of lever 131 after the arm 111 has been raised to its limit, that is in contact with the under side of shaft 107, see Fig. 24.

To insure the releasing of hook 117 from pin 110 before shaft 126 is rocked by starting lever 129, a stiff spring 134 is interposed between the lever 129 and shaft 126 preferably by having the spring coiled around the shaft and one end thereof secured to the lever 129 and the other end thereof secured to a collar 135 rigidly secured to shaft 126; the lever 129 being loosely mounted on shaft 126.

To positively start the roller 105 off of its dead center after bolt 118 has been withdrawn from slots 119 and hook 117 has been disengaged from pin 110, and arm 136 is secured to shaft 107 and has its free end connected by a link 137 to the free end of an arm 138 integral with a sleeve 139 loosely mounted on shaft 126 adjacent to the lever 129. The lever 129 is provided with a pin 140 which extends into a notch 141 provided in sleeve 139. The notch 141 is of such extent circumferentially that the first movement of the lever 129 will not effect the sleeve 139 but the final movement of lever 129 will positively move the roller 105 off of its dead center by pin 140 contacting with the wall of notch 141 in sleeve 139 and rocking said sleeve which rocks shaft 107 by the mechanism described.

The bolt 118 is normally held in slots 119 by a coiled expanding spring 142 interposed between the end of bar 120 and plug 143 screwed into the opening of hollow shaft 107, by which the tension of spring 142 may be adjusted.

It is obvious that the shaft 107 will be rocked so as to bring the roller 105 on a dead center pressing against collar 102 each time that the cam wheel 115 reaches such a position as to bring cam 116 under the roller 114 on lever 112, and as soon as it does reach such dead center position the bolt 118 will be moved into the slots 119 by spring 142 and lock it in such position; where it will remain until it is unlocked and again rocked as previously described.

Figures 6, 8, 9:
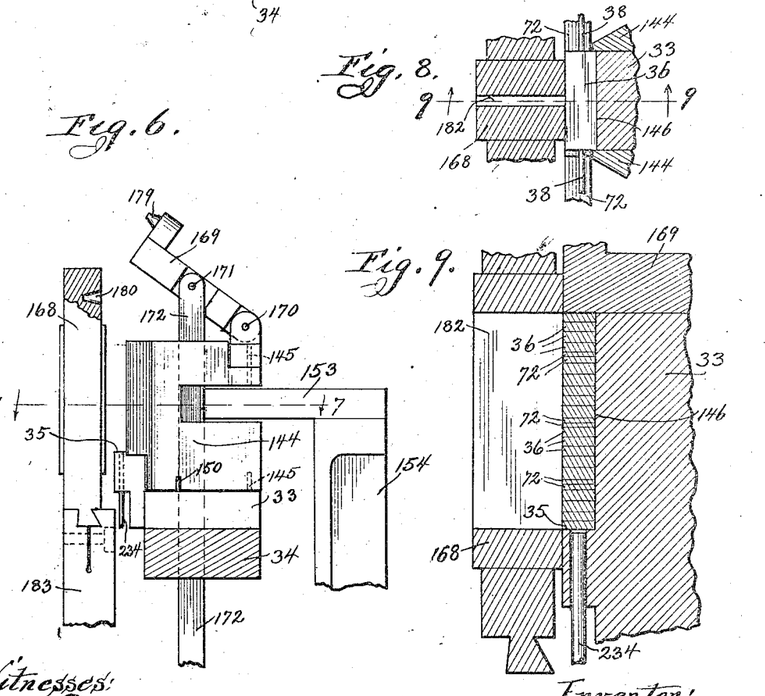
Fig. 6, is a side elevation of the same.
Fig. 8, is a similar view broken away and showing the matrix bars clamped in the casting position.
Fig. 9, is a section on line 9—9 of Fig. 8.
Figure 7:
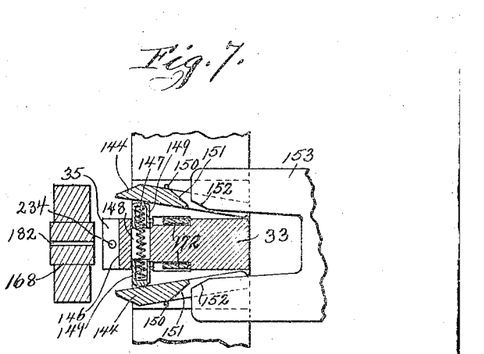
Fig. 7, is a plan section on line 7—7 of Fig. 6.

Referring again to the assembled line clamping mechanism best shown in Figs. 5 to 10, the block 33 is provided with the two side jaws 144 pivoted at 145 and so constructed that when they are in a closed position against the sides of the block 33 their vertical noses will extend slightly beyond the vertical face 146 of the block 33 against which the assembled line rests when in a casting position as seen in Fig. 8. It will also be noted that that part of the vertical noses of the jaws 144 which extends beyond the face 146 serves to engage the justifiers 72, which are slightly narrower than the matrix plates 36, and hold the justifiers in proper alinement vertically. The breadth horizontally of the face 146 is equal to the length of the matrix plates 36 and the length vertically of the face 146, that is from the upper surface of shelf 35 up to the top surface of block 33, is equal to the desired length of the slug to be cast.

The jaws 144 are normally held in an open position away from the block 33 by a coiled expanding spring 147 placed between the jaws in a hole 148 provided therefor in the block 33. The thimbles 149 are preferably placed over the ends of spring 147 to contact with jaws 144 and fitted to slide in hole 148. The jaws 144 are prevented from opening too far by the pins or stops 150 secured to the base of block 33. About midway its length each jaw 144 is provided with the inclined surface 151 arranged to be engaged by the inclined surface 152 on the plate 153 secured to the top of arm 154 which is pivoted on shaft 155 secured in frames 26 and 27. The normal position of the arm 154 is with the plate 153 back away from the surfaces 151 on jaws 144 and it is preferably so pivoted and weighted that it will move about its pivot to its normal position by force of gravity. To close the jaws 144 as seen in Fig. 8, the plate is forced toward the jaws so that the surfaces 152 slide upon the surfaces 151; this is accomplished during the one revolution of shaft 160 secured in frames 26 and 27 and the lever 158 has on its lower free end an antifriction roller 161 arranged to engage a cam wheel 162 on shaft 88. The lever 158 also extends above the shaft 160 and has its upper free end connected by link 163 to the casting pot 164 which is secured to the upper end of a frame 165 pivoted on shaft 166 secured in frames 26 and 27, so that the casting pot will be moved toward the assembled line at the same time that the jaws 144 close in on said assembled line.

The assembled matrix plates 36 are brought into perfect alinement in one direction by the noses of the jaws 144 pressing on both ends of all the matrix plates 36 in the assembled line, and in the other direction by being clamped tightly against the face 146 of block 33 by the action of the metal pot 164, whose snout 167 presses against one side of mold 168 while the other side of mold 168 is pressed against the matrix plates 36, when the lever 158 is actuated by cam 162.

Besides bringing the matrix plates 36 in perfect alinement they must be clamped together, that is vertically and to do this a top plate 169 is pivoted at 170 to block 33 arranged to fit down against the top surface of block 33 with its free end extending beyond the face 146 far enough to serve as an abutment for the assembled line of matrix plates 36, the shelf 35 serving as the abutment for the lower end of the assembled line. The normal position of the plate 169 is lifted so that its extreme free end is clear of a vertical line coinciding with face 146 as seen in Fig. 6, so that the matrix plates 36 will not be obstructed in their descent from the stored position to the assembled position.

Figure 1:
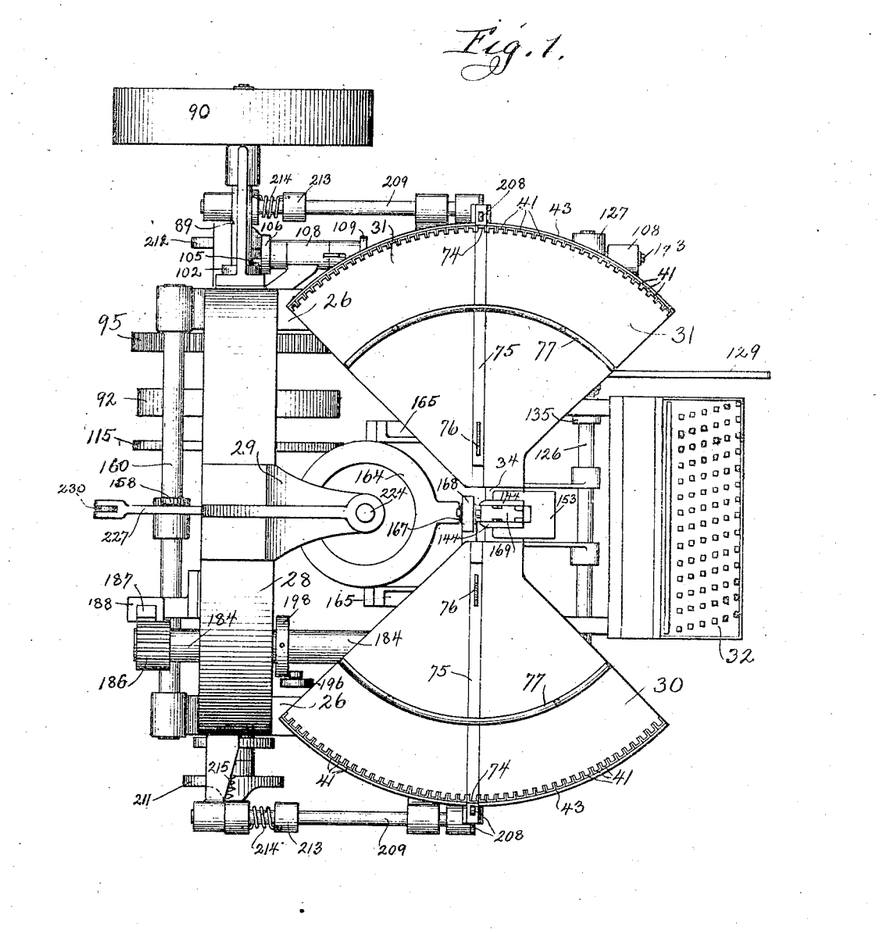
Figure 1, is a plan view with the matrix bars and justifiers omitted.
Figure 2:
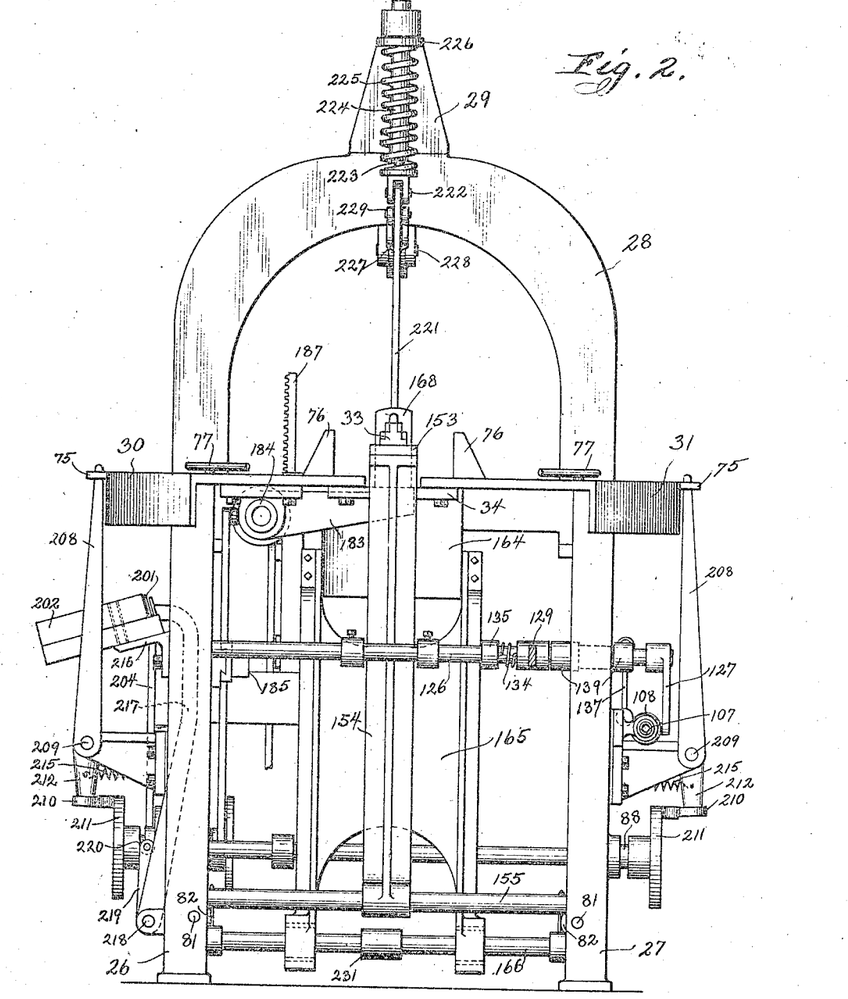
Fig. 2, is a front elevation of the same.
Figure 3:
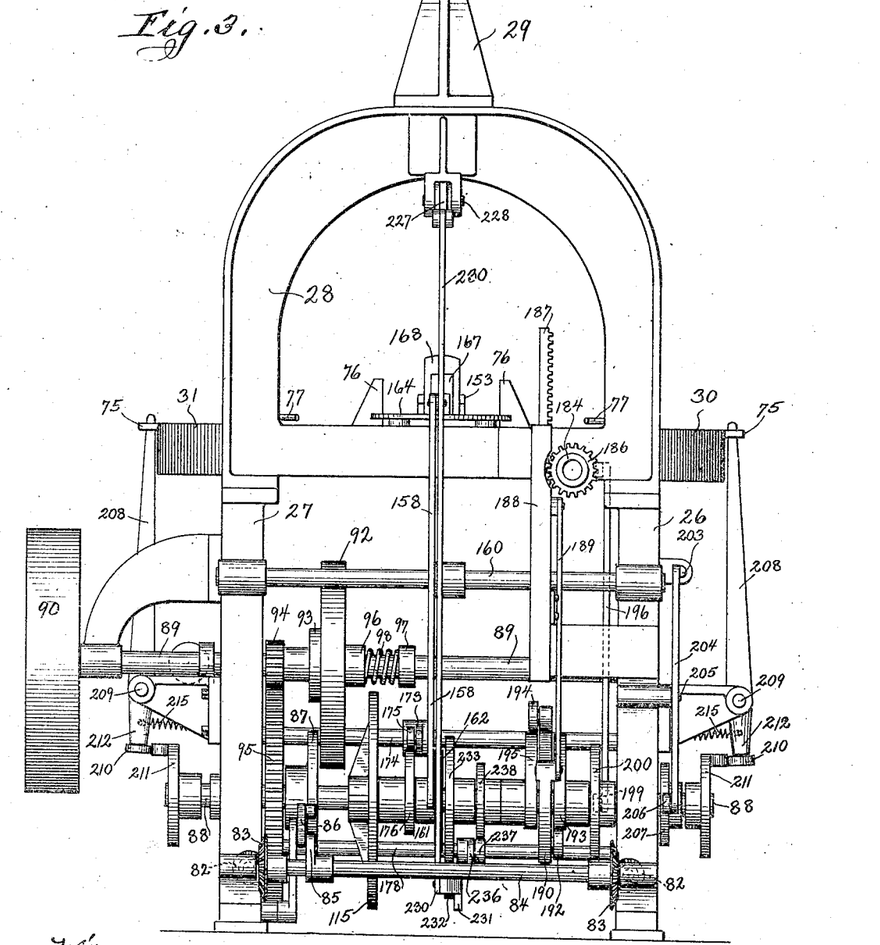
Fig. 3, is a rear elevation of the same.
Figure 4:
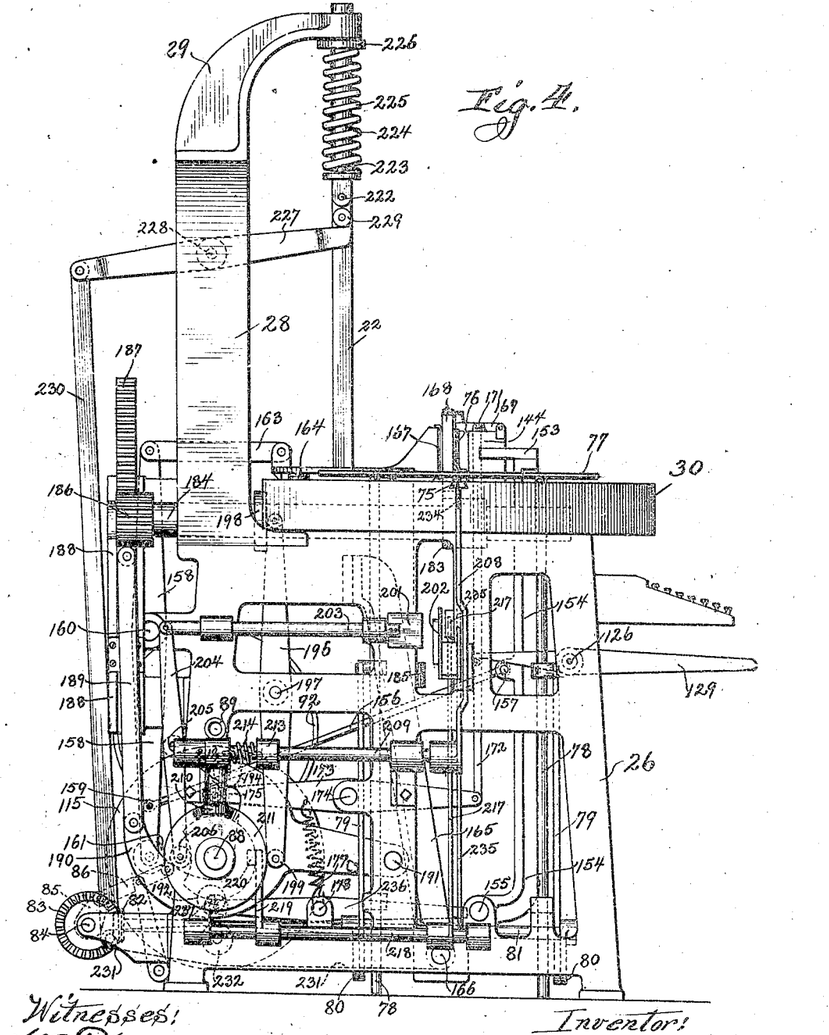
Fig. 4, is a side elevation.
Figure 5:
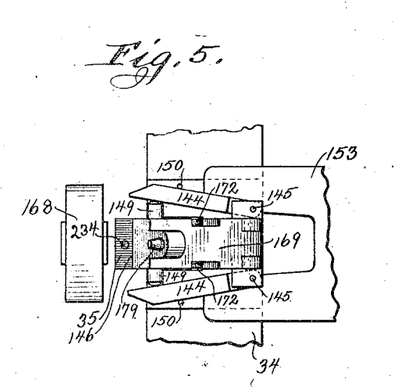
Fig. 5, is a plan of the assembled line clamping mechanism.

Pivotally secured to the plate 169 at 171 are the straps 172 extending down through apertures provided therefor in block 33 and pivotally connected to one end of a lever 173 pivoted midway its ends on shaft 174 secured in frames 26 and 25. The other end of lever 173 is provided with antifriction roller 174 arranged to engage cam 176 Fig. 3, secured on shaft 88. When the raised portion of cam 176 Fig. 3 contacts with roller 175 the plate 169 will be positively held down against the top of block 33 as seen in Fig. 4. The roller 175 is constantly held in contact with cam 176 by a coiled contracting spring 177 connected between lever 173 and shaft 178 secured in frames 26 and 27.

To get a true alinement of all the parts which clamp the assembled line of matrix plates 36, the jaws 144 extend slightly above the top of block 33 so as to clamp the plate 169 between them, and the plate 169 is provided with the conical extension 179 arranged to fit into the conical aperture 180 provided therefor, in the mold 168.

Extending rearward from, and secured to the shaft 126 are two arms 181 having their free ends pivotally connected to the straps 172, which serve to prevent the shaft 126 from being rocked to its full operative position to withdraw bolt 118 from slots 119 until the plate 169 is home on top of the block 33, thus preventing the operation of the machine unless a proper line has been assembled.

The mold 168 is provided with customary slot 182 of a length equal to the length of lug to be cast and is mounted on the free end of an arm 183 secured on shaft 184 mounted to rotate slightly less than a one half revolution in bearings secured to table 30 and frame 28. The shaft 184 also has a longitudinal movement sufficient to draw the mold away from the matrix plates 36 and bring the rear face of the mold into alinement with the trimming knife 185 secured to frame 26, after the slug has been cast.

The shaft 184 is rotated the proper distance by having a gear 186 secured to it which meshes with a vertically sliding rack 187 mounted in the guide 188 secured to frames 28 and 26. Pivotally connected to the rack 187 is the upper end of a link 189 whose lower end is pivotally connected to the free end of a lever 190 pivoted at 191 to frame 26 and provided with an anti-friction roller 192 below shaft 88 to engage cam 193 secured to shaft 88 and with the anti-friction roller 194 above shaft 88 to engage cam 195 secured to shaft 88. By the proper formations of cams 195 and 193 the rollers 194 and 192 will raise and lower the rack 187 and thus rotate shaft 184 forward and back by one revolution of shaft 88.

The shaft 184 is moved longitudinally in one direction by the snout 167 of the casting pot 164 moving the mold 168 against the assembled line of matrix plates 36, and in the opposite direction by a lever 196 pivoted midway its ends at 197 to frame 26 which has its upper end provided with an anti-friction roller arranged to engage a collar 198 secured on shaft 184, and has its lower end provided with a roller 199 arranged to engage cam 200 secured to shaft 88. The gear 186 is made wide enough to always be in mesh with rack 187 no matter what position longitudinally the shaft is in.

The mold 168 is normally in the ejecting position, that is, in position in front of the ejector 201, so that the cast slug can be ejected from slot 182 in mold 168 into the galley 202 by the ejector; but in the drawings for the purpose of illustration the mold is shown in the casting position where it remains long enough for the slug to be cast.

The ejector 201 is a flat plate slightly smaller in cross section than the slot 182 in mold 168 and is secured to one end of a sliding bar 203 mounted in bearings secured to frame 26. The other end of bar 203 is pivotally secured to the upper end of lever 204 which is pivoted midway its ends on frame 26 at 205 and has its lower end provided with the roller 206 arranged to engage the cam 207 secured on shaft 88, in such manner that the ejector 201 will be moved through the slot 182 in mold 168 at the proper time to eject the slug when the shaft 88 makes one complete revolution.

To operate the dove-tail sliding bars 75 to which the justifier pushers 76 are secured the outer extremities of the bars 75 are provided with apertures to receive the upper ends of the levers 208 secured to shafts 209 mounted to rock in bearings secured to frames 26 and 27. Mounted loosely on shafts 209 are depending arms 212 provided on their free ends with rollers 210 arranged to engage the cam wheels 211 secured on shaft 88. Secured to the shafts 209 adjacent to arms 212 are collars 213 and interposed between said arms 212 and collars 213 are the springs 214 coiled about shafts 209 each having one end secured to an arm 213 and its other end secured to a collar 213 in such manner that the shafts 209 are moved in either direction by the arms 212 through the introduction of springs 214. By this arrangement of parts it will be seen that the justifier wedges 72 will be forced through the assembled line of matrix plates 36 when the shaft 88 revolves to bring the raised portion of cams 211 in contact with rollers 210. The rollers 210 are held firmly in contact with cams 211 by springs 215 connected between arms 212 and frames 26 and 27, which springs also serve to pull back the justifier pusher bars 75. The strength of the springs 214 is sufficient to force the justifier wedges 72 into and through the assembled line of matrix plates 36 to completely justify the line.

I prefer to use a galley 202 which is removably secured to a bracket 216 secured to frame 26, and to push the slugs along in the galley as fast as they are fed into the same. I provide a push arm 217 secured to a rock shaft 218 mounted in bearings secured to frame 26. To rock the shaft 218 an arm 219 is secured thereto having on its free end a roller 220 arranged to engage a cam extending laterally from cam 207.

The casting pot plunger has connected to it the rod 221 having its upper end pivotally connected at 222 to a vertically sliding pin 223 mounted in sleeve 224 secured in bracket 29. A coil expanding spring 225 is interposed between a collar in rod 223 and a nut 226 adjustably mounted on sleeve 224 which constantly tends to force the plunger down in the casting pot to force the molten metal into the mold. The rod 221 and therefore the plunger also is normally held in a raised position against the tension of spring 225 by a lever 227, pivoted midway its ends at 228 on a bracket secured to frame 28, having its one end resting under a roller 229 secured to rod 221 and its other end pivotally connected to the upper end of a link 230 whose lower end is pivotally connected to the free end of a lever 231 extending under shaft 88 and pivoted on shaft 166. A roller 232 is provided on lever 231 to engage cam 233 secured on shaft 88 so that when a depression on cam 233 comes above roller 232 the plunger in the casting pot will be forced down and the molten metal will be forced into mold 182. Any means for heating the casting pot is provided.

In operation the operator depresses the desired keys of the keyboard which by the mechanism described drops the matrix bars and justifiers into the assembled line on shelf 35 of block 33; by observing the line the operator sees when a complete line is assembled when he lifts the operating lever 129; this by the mechanism described causes shaft 88 to be rotated one complete revolution which as described will clamp the assembled line, cast the slug in mold 168, trim the slug by passing knife 185, eject the slug into galley 202, and return all the matrix bars and justifiers which had been assembled to their stored position, leaving all the mechanism in a normal position ready for another operation.

After the slug has been cast and the clamps released from the assembled line and just before the rods 77 start to lift the matrix bars and justifiers I prefer to start the assembled line upward by having a pin 234 mounted to slide vertically in a perforation provided therefor in block 33 lifted to contact with the lowermost matrix plate 36 of the assembled line. To lift the pin 234 positively and at the proper time it is mounted on the upper end of a bar 235 provided at its lower end with a perforation into which one end of a lever 236 extends; the lever 236 is pivoted midway its ends in shaft 178 and has its other end provided with a roller 237 arranged to engage cam 238 mounted on shaft 88 in such manner that when shaft 88 is rotated the raised portion of cam 238 will depress roller 237 and lift pin 234 to start the assembled line upward. After the assembled line of matrix bars and justifiers have been started up by pin 234 the rods 77 raise and lift them to their stored position where they are retained by the devices described after rods 77 recede to their normal position.

While I have shown and described a construction which I at present consider the best it will be understood that numerous and radical changes may be made in the construction and operation of parts of the machine without departing from the spirit of the invention or the scope of the matter included in the appended claims.

Having thus fully described my invention what I claim as new and desire to secure by Letters Patent of the United States is:

1. In a composing machine, a series of pivoted flexible matrix bars arranged to swing by gravity from their stored position into their assembled position in a common vertical line and a clamping device for clamping and alining said assembled line.

2. In a composing machine, a series of pivoted matrix bars arranged to swing by gravity from their stored position into their assembled position in a vertical line, a device for clamping and alining said assembled line of matrices, a series of keys and connections between the keys and matrix bars.

3. In a composing machine, a series of pivoted matrix bars arranged to swing by gravity from their stored position into their assembled position in a vertical line, a device for alining and clamping said assembled line of matrices, a series of escapements for retaining said matrices in a stored position and releasing them, a series of keys and connections between said keys and said escapements.

4. In a machine for casting slugs of type, a melting pot and a mold, a device for clamping and alining a vertical assembled line of matrix bars, two series of matrix bars pivoted in standards arranged in arcs concentric with said clamping device and on either side thereof and means for assembling the matrices in said vertical line.

5. In a machine for casting slugs of type, a melting pot and a mold, a device for clamping and alining a vertical assembled line of matrix bars, two series of flexible matrix bars pivoted in standards arranged in arcs concentric with said clamping device and located diametrically opposite on either side thereof and means for assembling said matrix bars in a vertical line in said clamping device.

6. In a composing machine, groups of pivoted matrix bars arranged to swing by gravity into a common vertical line and a vertical standard for each group of matrix bars carrying the pivots of each bar of said group.

7. In a composing machine, groups of pivoted matrix bars arranged to swing by gravity into a common vertical line, a device for alining and clamping said line of matrix bars and an arcuate series of supports concentric with said clamping device to which said matrix bars are pivoted.

8. In a composing machine, a series of matrices arranged to be assembled into line, a series of keys upon a keyboard and mechanism connecting said keys with said matrices comprising a constantly running shaft, a series of cams loosely mounted on said shaft and means for causing the cams to operate by depressing the keys.

9. In a composing machine, a matrix bar, a key upon a keyboard and mechanism connecting said key with said matrix bar comprising a constantly running shaft, a cam loosely mounted on said shaft, a notched disk adjacent to said cam rigidly secured to said shaft, a trip lever, a spring pressed catch mounted on said cam arranged to engage the notched disk but normally held out of such engagement by said trip-lever and means for actuating said trip-lever by depressing said key.

10. In a composing machine, a series of matrices arranged to be assembled into line, a series of keys upon a keyboard and mechanism connecting said keys and said matrices comprising a constantly running shaft, a series of cams loosely mounted on said shaft, a series of trip-levers connected to said keys to control the cams and a series of valves controlling a pressure fluid to operate said matrices arranged to be operated by said cams.

11. An escapement device comprising a rod mounted to rotate a one quarter revolution and provided with a pair of oppositely disposed catches in one plane and a pair of oppositely disposed catches in another plane, said two pairs of catches being arranged at right angles to each other.

12. In a composing machine, means for casting a slug in a vertical position comprising a casting pot, a plurality of matrices and means for clamping said matrices in a vertical line.

13. In a composing machine, means for assembling matrices in a vertical line comprising a plurality of matrices, arranged to swing about fixed pivots by gravity into an assembled position and means for clamping said matrices in a vertical line.

14. In a composing machine, matrix bars secured to the end of a wire, justifiers slightly narrower than said matrix bars, means for assembling the matrix bars and justifiers into a line and means for clamping the assembled line in position comprising jaws to engage the ends of the matrix bars.

15. Means for clamping an assembled line of matrices in a vertical line comprising a vertical stationary block provided with a horizontal shelf, a vertical mold and two movable jaws arranged to swing on vertical pivots.

16. In a composing machine, a suitable frame, a matrix line clamping device, matrix bar standards arranged in an arc about said line clamping device, matrix bars pivoted to said standards so as to fall by gravity into an assembled position in said clamping device and releasing mechanism for normally holding said matrices in an inclined position.

17. In a composing machine, groups of pivoted matrix bars arranged to swing by gravity into a common vertical line, a clamping device for alining and clamping the assembled line of matrix bars, a series of tapered justifiers stored on one side of said clamping device arranged to swing by gravity into the assembled line of matrix bars, a series of oppositely tapered justifiers stored on opposite side of said clamping device arranged to swing by gravity into the assembled line of matrix bars and means whereby the operation of a key will release and allow one justifier from either side to swing into the assembled line.

18. In a composing machine, a suitable frame, a series of matrix bars arranged to swing by gravity from their stored position into their assembled position in a common line, a clamping device for clamping and alining said assembled line, uprights secured to said frame in an arc about said clamping device, said matrix bars pivotally secured to said uprights and a vertically moving bar for restoring the matrix bars to their stored position.

19. In a composing machine, matrix bars, means for assembling said matrix bars into a vertical line and means for clamping, alining and testing the length of said line comprising a stationary block provided with a shelf, two side jaws and a top plate.

20. In a composing machine, means for clamping an assembled line of matrix bars in a vertical position, comprising a stationary vertical block provided with a shelf for supporting the matrix bars, two movable side jaws for alining the matrix bars, a vertical mold for clamping the line against said vertical block and a top plate for testing the length of the line.

21. In a composing machine, a suitable frame provided with uprights having two opposing sides, said sides provided with concentric holes, matrix plates secured to a supporting rod provided with two branches at its free end terminating in oppositely disposed pivots extending into said holes.

22. In a composing machine, a suitable frame provided with uprights having two opposing sides provided with concentric holes, a matrix plate secured to a rod provided with two parallel branches having their extremities bent outward at right angles to form pivots extending into said holes.

23. In a composing machine, a plurality of matrix plates, means for assembling said matrix plates in a line, a clamping device for alining and clamping said line into position, a suitable frame provided with a series of uprights arranged in an arc about said clamping device and having two opposing sides provided with concentric holes, each of said matrix plates secured to a rod provided with two branches having their extremities bent at right angles to form pivots extending into said holes.

24. In a composing machine, a plurality of matrix plates, means for assembling said matrix plates in a line, a clamping device for alining and clamping said assembled line into position, a suitable frame provided with a series of uprights arranged in an arc concentric with and on one side of said clamping device and a series of uprights arranged in an arc concentric with and on the diametrical opposite side of said clamping device said uprights having two opposing sides provided with concentric holes each of said matrix plates secured to a rod terminating in two oppositely disposed pivots extending into said holes in said uprights.

25. In a composing machine, matrix bars arranged to be assembled into line, a clamping device for alining and clamping said line into position comprising a stationary vertical block provided with a shelf, two side clamping jaws and a top plate to move toward and away from said shelf, means for returning said matrix bars to their stored position a casting pot, a mold, a one revolution cam shaft to produce the several operations of clamping the assembled line returning the matrix bars to their stored position, and casting and ejecting the slug, a constantly rotating drive shaft and means forming connection between said cam shaft and said constantly rotating drive shaft controlled by said top plate of the clamping device whereby said cam shaft is prevented from operating when the assembled line is too long.

26. In a composing machine, matrix bars arranged to be assembled into a vertical line representing words, a clamping device for alining and clamping said line into position, a suitable frame supporting said clamping device, a series of tapered wedges each forming one member of a two-piece justifier pivoted on one upright provided on said frame on one side of said clamping device and arranged to swing from their stored position into the assembled line by gravity, a second series of oppositely tapered wedges each forming the other member of a two-piece justifier pivoted on an upright provided on said frame on the opposite side of said clamping device and arranged to swing by gravity from their stored position into the assembled line and means for moving one of said series of wedges longitudinally through the assembled line to justify the same.

27. In a composing machine, matrix bars arranged to be assembled into a vertical line representing words, a clamping device for alining and clamping said line into position, a suitable frame supporting said clamping device, a horizontally disposed slide mounted in said frame on one side of said clamping device provided with an upright, a series of tapered wedges secured to rods pivoted in said upright arranged to swing by gravity from their stored position into said assembled line, a second series of oppositely tapered wedges secured to rods pivoted in an upright provided on said frame on the opposite side of said clamping device and arranged to swing by gravity from their stored position into the assembled line, and means for moving said slide toward and away from said clamping device.

28. In a composing machine, matrix bars arranged to be assembled into a vertical line representing words, a clamping device for alining and clamping said line in position, a suitable frame supporting said clamping device, a horizontally disposed slide mounted in said frame on one side of said clamping device provided with an upright having horizontally disposed holes, a series of tapered wedges each secured to a rod terminating in pivots extending into said holes in said upright, a second horizontally disposed slide mounted in said frame on the opposite side of said clamping device provided with an upright having horizontally disposed holes, a second series of tapered wedges each secured to a rod terminating in pivots extending into said holes in said second named upright and means for simultaneously moving said slides toward and away from said clamping device.

29. In a machine of the class described a melting pot and a mold, a device for clamping and alining a vertical assembled line of matrix bars, a series of matrix bars pivoted in standards and means for assembling said matrix bars in a vertical line in said clamping device.

30. In a machine of the class described a melting pot and a mold, a device for clamping and alining a vertical assembled line of matrix bars, a series of matrix bars pivoted in standards and means for assembling said matrix bars in a vertical line in said clamping device.

31. In a composing machine a series of pivoted flexible matrix bars arranged to swing from their stored position into their assembled position in a common vertical line, means whereby each matrix bar normally tends to swing from its stored position to its assembled position, means for retaining said matrix bars in their stored position and a clamping device for clamping and alining said assembled line.

32. In a composing machine a series of pivoted matrix bars arranged to swing from their stored positions into their assembled position in a vertical line means whereby the matrix bars normally tend to swing from their stored positions to their assembled positions, means for retaining said matrix bars in their stored position and releasing them one at a time, a series of keys and connections between said keys and said last named means, and a device for clamping and alining said assembled line of matrices.

33. In a composing machine, groups of pivoted matrix bars arranged to normally tend to swing from their stored position to their assembled position into a common vertical line, means for controlling the matrix bars, means for holding the matrix bars in an assembled position, and a vertical standard for each group of matrix bars carrying the pivots of each bar of said group.

34. In a composing machine a series of matrices arranged to be assembled into line, a series of pneumatic devices to control the movement of said matrices, a series of valves connected by tubes to said pneumatic devices, a series of keys upon a keyboard and a constantly running shaft to operate said valves when the keys are operated.

35. An escapement device comprising a rod mounted to rotate a one quarter revolution and provided with a pair of oppositely disposed catches and a second pair of oppositely disposed catches arranged at right angles to said first named catches.

36. In a composing machine, a plurality of matrices arranged to swing about fixed pivots from a stored position to an assembled position, means for releasing the matrices from the stored position one by one, a plurality of justifiers arranged to swing about fixed pivots from a stored position to an assembled position, means for causing said justifiers to normally tend to swing into the assembled position and means comprising a one-quarter revolving rod for retaining said justifiers in a stored position and releasing them one by one.

37. In a composing machine, a series of pivoted matrix bars constantly tending to swing from their stored position to their assembled position, means comprising a one-quarter revolving rod for retaining said matrix bars in a stored position and releasing them one by one and means for clamping and alining the assembled matrix bars.

38. In a composing machine, a melting pot and a mold, a device for clamping and alining a vertical assembled line of matrix bars, a series of matrix bars pivoted in an arcuate member concentric with said clamping device and means for assembling the matrices in said vertical line.

39. In a composing machine, a group of pivoted matrix bars arranged to swing by gravity into a common vertical line and a vertical standard for said group of matrix bars carrying the pivots of said bars, and means for clamping the matrix bars in a vertical line.

40. In a composing machine, a group of pivoted matrix bars arranged to swing into a common vertical line, a device for alining and clamping said vertical line of matrix bars and an arcuate support concentric with said clamping device to which said matrix bars are pivoted.

In testimony whereof I have signed my name to this specification in presence of two subscribing witnesses this 20th day of December, 1910, at Chicago, Illinois.

HENRY H. HARDINGE.

Witnesses:
W. HARDING,
B. HANSEN.